(12) United States Patent
Fujinami et al.

(10) Patent No.: US 9,062,270 B2
(45) Date of Patent: Jun. 23, 2015

(54) BEARING GREASE

(75) Inventors: Yukitoshi Fujinami, Ichihara (JP);
Fumihiko Yokoyama, Tokyo (JP)

(73) Assignees: IDEMITSU KOSAN CO., LTD., Tokyo (JP); IHI Corporation, Tokyo (JP)

( * ) Notice: Subject to any disclaimer, the term of this patent is extended or adjusted under 35 U.S.C. 154(b) by 0 days.

(21) Appl. No.: 13/976,659

(22) PCT Filed: Dec. 27, 2011

(86) PCT No.: PCT/JP2011/080226
§ 371 (c)(1),
(2), (4) Date: Jul. 3, 2013

(87) PCT Pub. No.: WO2012/091019
PCT Pub. Date: Jul. 5, 2012

(65) Prior Publication Data
US 2014/0080744 A1    Mar. 20, 2014

(30) Foreign Application Priority Data

Dec. 27, 2010 (JP) ................................ 2010-290715

(51) Int. Cl.
*C10M 115/08* (2006.01)
*F16C 33/20* (2006.01)
(Continued)

(52) U.S. Cl.
CPC ........... *C10M 115/08* (2013.01); *C10M 169/02* (2013.01); *C10M 171/008* (2013.01); *C10M 2207/0406* (2013.01); *C10M 2215/1026* (2013.01); *C10N 2220/301* (2013.01); *C10N 2220/302* (2013.01); *C10N 2230/06* (2013.01); *C10N 2240/02* (2013.01);
(Continued)

(58) Field of Classification Search
CPC ............... C10M 2215/1026; C10M 2207/125; C10M 2211/06; C09K 2205/32
USPC ............ 508/106, 517, 552, 579, 588; 252/67, 252/68
See application file for complete search history.

(56) References Cited

U.S. PATENT DOCUMENTS

2008/0166080 A1* 7/2008 Kawamura ................... 384/462
2011/0037016 A1* 2/2011 Singh et al. .................... 252/67

FOREIGN PATENT DOCUMENTS

CN 1147539 A 4/1997
CN 101522869 A 9/2009
(Continued)

OTHER PUBLICATIONS

International Search Report Issued Feb. 14, 2012 in PCT/JP11/80226 Filed Dec. 27, 2011.
(Continued)

*Primary Examiner* — Vishal Visisth
(74) *Attorney, Agent, or Firm* — Oblon, McClelland, Maier & Neustadt, L.L.P.

(57) ABSTRACT

Bearing grease includes an ether base oil and a urea thickener, and is used in an atmosphere of a fluorine compound-based refrigerant. No grease is eluted for a long period in a bearing with use of the bearing grease. Moreover, since a collection system is unnecessary unlike a lubricating oil, the surroundings of the bearing can be made compact. Accordingly, the bearing with use of the bearing grease is easily applicable to automobiles and a variety of industrial machinery as an energy collection apparatus using the Rankine cycle.

13 Claims, 3 Drawing Sheets

(51) Int. Cl.
*C10M 173/02* (2006.01)
*C10M 107/34* (2006.01)
*C07C 15/24* (2006.01)
*C09K 5/04* (2006.01)
*C10M 169/02* (2006.01)
*C10M 171/00* (2006.01)
*F16C 33/66* (2006.01)

(52) U.S. Cl.
CPC ........ *C10N 2240/30* (2013.01); *C10N 2250/10* (2013.01); *F16C 33/6633* (2013.01); *C10M 2205/0285* (2013.01); *C10M 2207/122* (2013.01); *C10M 2207/123* (2013.01); *C10M 2207/2835* (2013.01); *C10N 2220/022* (2013.01)

(56) References Cited

FOREIGN PATENT DOCUMENTS

| | | |
|---|---|---|
| EP | 2 489 721 A1 | 8/2012 |
| JP | 03-199296 A | 8/1991 |
| JP | 5 5491 | 1/1993 |
| JP | 9 303278 | 11/1997 |
| JP | 2004-263836 A | 9/2004 |
| JP | 2008 163998 | 7/2008 |
| JP | 2008 239815 | 10/2008 |
| JP | 2010 90285 | 4/2010 |
| JP | 2011 99021 | 5/2011 |
| JP | 2012 13566 | 1/2012 |

OTHER PUBLICATIONS

U.S. Appl. No. 14/122,849, filed Nov. 27, 2013, Fujinami, et al.

Combined Chinese Office Action and Search Report issued Apr. 17, 2014 in Patent Application No. 201180068490.3 (with English language translation of the Office Action and English translation of categories of cited documents).

Extended European Search Report issued May 28, 2014 in Patent Application No. 11854011.1.

Office Action issued Sep. 2, 2014 in Japanese Patent Application No. 2010-290715 (with English language translation).

\* cited by examiner

BEARING GREASE

CROSS REFERENCE TO RELATED APPLICATIONS

The present application is a 35 U.S.C. §371 national stage patent application of international patent application PCT/JP2011/080226, filed on Dec. 27, 2011, published as WO 2012/091019 on Jul. 5, 2012, the text of which is incorporated by reference, and claims the benefit of the filing dates of Japanese Patent Application No. 2010-290715, filed on Dec. 27, 2010, the text of which is also incorporated by reference.

TECHNICAL FIELD

The present invention relates to bearing grease used in an atmosphere of a fluorine compound-based refrigerant.

BACKGROUND ART

In a refrigeration cycle and the Rankine cycle, lubrication in an atmosphere of a fluorine compound-based refrigerant (lubrication with a liquid refrigerant) is generally performed. As a lubricating oil (base oil) suitable for lubrication with a liquid refrigerant, a base oil such as polyoxyalkylene glycol, ester, polyvinyl ether and alkyl benzene, which is compatible with a refrigerant, is used (see, for instance, Patent Literatures 1 and 2).

Since a turbo machine is operated at a high speed, lubrication of a bearing therein generally requires use of a lubricating oil in order to maintain cooling performance and lubricity of the bearing. When a high-speed bearing is used in an atmosphere of a refrigerant in the same manner as in a refrigeration cycle and the Rankine cycle, an appropriate lubricating oil designed with allowance for viscosity reduction by atmospheric gas is generally applied.

When a bearing lubricated with grease is usable in lubrication with a liquid refrigerant, a circulating system of a lubricating oil and a separator of a refrigerant and a lubricating oil can be simplified, so that the circulating system and the separator can be advantageously made compact, light-weighted and highly efficient. However, since grease for lubricating a bearing is washed away from the bearing in a refrigerant atmosphere, lubrication with grease has been considered extremely difficult. It should be noted that Patent Literature 3 discloses use of grease containing $MoS_2$ in lubrication with a liquid refrigerant. However, compositions of a main component of the grease are unclear.

CITATION LIST

Patent Literatures

Patent Literature 1: JP-A-2010-090285
Patent Literature 2: JP-A-2008-239815
Patent Literature 3: JP-A-5-5491

SUMMARY OF THE INVENTION

Problems to be Solved by the Invention

Since Patent Literature 3 only discloses grease containing $MoS_2$ of which a main component is unclear, elution of grease is considered inherent.

An object of the invention is to provide bearing grease that is only slightly eluted even in an atmosphere of a fluorine compound-based refrigerant and that is capable of keeping lubricity of a bearing for a long period.

Means for Solving the Problems

After dedicated study, inventors found that, with use of grease containing a specific base oil and a specific thickener, the grease is not washed away from an inside of a bearing even in a refrigerant atmosphere. The invention is completed based on this finding.

Specifically, the invention provides the following bearing grease.
(1) Bearing grease according to an aspect of the invention includes an ether base oil and a urea thickener, and is used in an atmosphere of a fluorine compound-based refrigerant.
(2) In the grease composition according to the above aspect of the invention, the base oil is an aromatic ether base oil.
(3) In the grease composition according to the above aspect of the invention, the aromatic ether base oil is at least one of an alkylphenyl ether base oil and a diphenyl ether base oil.
(4) In the grease composition according to the above aspect of the invention, the urea thickener is a reactant of methylenediisocyanate and aliphatic monoamine having 6 to 12 carbon atoms.
(5) In the grease composition according to the above aspect of the invention, a worked penetration of the grease is in a range of 200 to 380.
(6) In the grease composition according to the above aspect of the invention, the fluorine compound-based refrigerant is either a fluorine compound represented by the following molecular formula (A) or a saturated fluorohydrocarbon compound, $$C_pO_qF_rR_s \qquad (A)$$

in the formula: R represents Cl, Br, I or H; p is an integer of 1 to 8; q is an integer of 0 to 2; r is an integer of 1 to 18; and s is an integer of 0 to 17, with a proviso that, when q is 0, p is 2 to 8 and at least one carbon-carbon unsaturated bond is contained in a molecule.
(7) In the grease composition according to the above aspect of the invention, the fluorine compound-based refrigerant is at least one compound selected from $C_4F_9OCH_3$, $CF_3CF_2C(O)CF(CF_3)_2$, $CF_3CH_2OCF_2CHF_2$, $CF_3CHFCHFCF_2CF_3$, $CF_3$—$(OC(CF_3)FCF_2)m$-$(OCF_2)$n-$OCF_3$ and $CF_3CH_2CF_2CH_3$.
(8) In the grease composition according to the above aspect of the invention, the fluorine compound-based refrigerant is at least one compound selected from $C_4F_9OCH_3$, $CF_3CH_2OCF_2CHF_2$, $CF_3CHFCHFCF_2CF_3$, $CF_3$—$(OC(CF_3)FCF_2)m$-$(OCF_2)n$-$OCF_3$ and $CF_3CH_2CF_2CH_3$.
(9) In the grease composition according to the above aspect of the invention, the bearing is used in a Rankine cycle.
(10) In the grease composition according to the above aspect of the invention, the bearing is used in a turbo Rankine cycle.

According to the bearing grease of the invention, since grease is not eluted into a fluorine compound-based refrigerant, lubricity of a bearing can be kept for a long period. Moreover, since a collection system is unnecessary unlike a lubricating oil, the surroundings of the bearing can be made compact. Accordingly, a liquid refrigerant lubrication system that is compact, light-weighted and excellent in efficiency can be designed in the Rankine cycle, a refrigeration cycle or the like.

DESCRIPTION OF EMBODIMENT(S)

A bearing grease according to an exemplary embodiment of the invention (hereinafter, also referred to as "the grease") includes an ether base oil and a thickener. However, an ether compound used in the ether base oil does not include an ether compound containing a fluorine atom in a molecule (e.g., perfluoropolyalkyl ether (PFPE)). Use of this compound as the base oil is not favorable since grease prepared from this compound is highly soluble in a fluorine compound. Accordingly, addition of a compound other than the ether compound as the base oil is desirably 30 mass % or less based on a total amount of the base oil.

The ether compound used as the base oil may be of any kinematic viscosity at 40 degrees C. However, in terms of torque loss and lubricity of the bearing, the kinematic viscosity at 40 degrees C. of the ether compound is preferably in a range of 2 mm$^2$/s to 10000 mm$^2$/s, more preferably of 10 mm$^2$/s to 1000 mm$^2$/s, further preferably of 20 mm$^2$ is to 400 mm$^2$/s.

As the ether compound used as the base oil, an aromatic ether compound is preferable since only a small amount of the ether compound is eluted into a refrigerant. Among the aromatic ether compound, an alkylphenyl ether compound or a diphenyl ether compound is particularly preferable.

In the alkylphenyl ether compound, an alkyl group preferably has 2 to 14 carbon atoms, more preferably 6 to 14 carbon atoms in terms of viscometric properties. The alkyl group may be linear or branched. A phenyl group may be unsubstituted, or alternatively, may be substituted by a single alkyl group or plural alkyl groups. When the phenyl group has a substituted alkyl group, the substituted alkyl group preferably has 2 to 14 carbon atoms, more preferably 6 to 14 carbon atoms in terms of viscometric properties. When plural substituents exist, the substituents may be the same or different, but are preferably the same for easy manufacturing.

Examples of the alkylphenyl ether compound include: various isomers of ethyl phenyl ether, propyl phenyl ether, butyl phenyl ether, pentyl phenyl ether, hexyl phenyl ether, heptyl phenyl ether, octyl phenyl ether, nonyl phenyl ether, decyl phenyl ether, undecyl phenyl ether, dodecyl phenyl ether, tridecyl phenyl ether and tetradecyl phenyl ether; and a compound provided by substituting a phenyl group of the isomers with an alkyl group.

One or both of phenyl groups of the diphenyl ether compound may be unsubstituted, or alternatively, may be substituted by a single alkyl group or plural alkyl groups. When plural substituents exist, the substituents may be the same or different, but are preferably the same for easy manufacturing. Particularly in terms of viscometric properties, tetraalkyl diphenyl ether provided by substituting the respective phenyl groups with two alkyl groups is preferable. The substituted alkyl group preferably has 2 to 14 carbon atoms, more preferably 6 to 14 carbon atoms in terms of viscometric properties to form an oil film thickness suitable for lubrication of the bearing and to provide running torque suitable for less bearing loss. The alkyl group may be linear or branched.

Examples of the diphenyl ether compound include various isomers of diphenyl ether, diethyl diphenyl ether, dipropyl diphenyl ether, dibutyl diphenyl ether, dipentyl diphenyl ether, dihexyl diphenyl ether, diheptyl diphenyl ether, dioctyl diphenyl ether, dinonyl diphenyl ether, didecyl diphenyl ether, diundecyl diphenyl ether, didodecyl diphenyl ether, ditridecyl diphenyl ether, ditetradecyl diphenyl ether, ditolyl ether, dixylyl ether, tetraethyl diphenyl ether, tetrapropyl diphenyl ether, tetrabutyl diphenyl ether, tetrapentyl diphenyl ether, tetrahexyl diphenyl ether, tetraheptyl diphenyl ether, tetraoctyl diphenyl ether, tetranonyl diphenyl ether and tetradecyl diphenyl ether.

Among the above ether compounds, for instance, tetraalkyl diphenyl ether represented by the following formula is preferably applicable. Herein, the alkyl groups ($R^1$, $R^2$, $R^3$, $R^4$) are, for instance, $C_8H_{17}$, $C_{10}H_{21}$, $C_{12}H_{23}$ and the like.

[Formula 1]

As the thickener contained in the base oil, a urea compound is used since providing an excellent lubricity to the bearing and being capable of inhibiting elution of the base oil. Examples of the urea compound include a monourea compound, diurea compound, triurea compound and tetraurea compound, among which a diurea compound is particularly preferable in terms of lubricity for the bearing.

The diurea compound is exemplified by a compound represented by general formula (1), in the formula: $R^1$ and $R^3$ each independently represent a monovalent chain hydrocarbon group having 4 to 22 carbon atoms, a monovalent alicyclic hydrocarbon group having 6 to 12 carbon atoms, or a monovalent aromatic hydrocarbon group having 6 to 12 carbon atoms; and $R^2$ represents a divalent aromatic hydrocarbon group having 6 to 15 carbon atoms.

It should be noted that $R^1$, $R^2$ and $R^3$ in the formula (1) are irrelevant to the substituents of the above tetraalkyl diphenyl ether.

Examples of the divalent aromatic hydrocarbon group having 6 to 15 carbon atoms and represented by $R^2$ in the formula (1) are a phenylene group, a diphenylmethane group and a tolylene group.

The monovalent chain hydrocarbon group having 6 to 22 carbon atoms and represented by $R^1$ and $R^3$ in the formula (1) is exemplified by a linear or branched and saturated or unsaturated alkyl group, examples of which include a linear alkyl group and a branched alkyl group such as hexyl groups, heptyl groups, octyl groups, nonyl groups, decyl groups, undecyl groups, dodecyl groups, tridecyl groups, tetradecyl groups, pentadecyl groups, hexadecyl groups, heptadecyl groups, octadecyl groups, octadecenyl groups, nonadecyl groups and icodecyl groups.

The monovalent alicyclic hydrocarbon group having 6 to 12 carbon atoms and represented by $R^1$ and $R^3$ in the formula (1) is exemplified by a cyclohexyl group or an alkyl-substituted cyclohexyl group having 7 to 12 carbon atoms, examples of which include, in addition to the cyclohexyl group, a methyl cyclohexyl group, dimethyl cyclohexyl group, ethyl cyclohexyl group, diethyl cyclohexyl group, propyl cyclohexyl group, isopropyl cyclohexyl group, 1-methylpropyl cyclohexyl group, butyl cyclohexyl group, amyl cyclohexyl group, amyl-methyl cyclohexyl group and hexyl cyclohexyl group. Among these, a cyclohexyl group, a methyl cyclohexyl group, an ethyl cyclohexyl group and the like are preferable for manufacturing reasons.

Examples of the monovalent aromatic hydrocarbon group having 6 to 12 carbon atoms and represented by $R^1$ and $R^3$ in the formula (1) include a phenyl group, toluyl group, benzyl group, ethyl phenyl group, methyl benzyl group, xylyl group, propyl phenyl group, cumenyl group, ethyl benzyl group, methyl phenethyl group, butyl phenyl group, propyl benzyl group, ethyl phenethyl group, pentyl phenyl group, butyl benzyl group, propyl phenethyl group, hexyl phenyl group, pentyl pendyl group, butyl phenethyl group, heptyl phenyl group, hexyl benzyl group, pentyl phenethyl group, octyl phenyl group, butyl benzyl group, hexyl phenethyl group, nonyl phenyl group and octyl benzyl group.

In the exemplary embodiment of the invention, a ratio of the hydrocarbon group at each of $R^1$ and $R^3$ which are end groups of the diurea compound is not particularly limited, in other words, composition of raw-material amine (or mixed amine) for forming $R^1$ and $R^3$ is not particularly limited. However, a chain hydrocarbon group is preferably a main component.

The diurea compound is typically obtainable by reacting diisocyanates with monoamines. Examples of diisocyanates include diphenylene diisocyanate, 4,4'-diphenyl methane diisocyanate (methylene diisocyanate), and tolylenediisocyanate, among which diphenyl methane diisocyanate is preferable because of less harmfulness. Monoamines are exemplified by amines corresponding to the chain hydrocarbon group, alicyclic hydrocarbon group and aromatic hydrocarbon group which are represented by $R^1$ and $R^3$ in the formula (1). Examples of the monoamines include: a chain hydrocarbon amine such as octyl amine, dodecyl amine, octadecyl amine and octadecenyl amine; an alicyclic hydrocarbon amine such as cyclohexyl amine; an aromatic hydrocarbon amine such as aniline and toluidine; and a mixed amine thereof.

Among the monoamines for manufacturing the diurea compound, the aliphatic amine preferably having 4 to 22 carbon atoms, more preferably having 6 to 12 carbon atoms, accounts for 50 mass % or more of a total amount of the monoamines in order to prevent the base oil from eluting into the refrigerant. The ratio of the aliphatic monoamine having the carbon atoms within the above range accounts for preferably 70 mass % or more, more preferably 80 mass % or more. Moreover, among the above aliphatic amine, one having 6 to 12 carbon atoms preferably accounts for 60 mass % or more, more preferably 80 mass % or more.

A content of the thickener is not limited as long as the thickener and the base oil in combination can form grease and be kept as the grease, but is preferably in a range of 2 mass % to 20 mass % of a total amount of the grease, more preferably of 5 mass % to 16 mass % in terms of fluidity and low-temperature characteristics.

The thickener used in the grease according to the exemplary embodiment provides consistency. An excessively small content of the thickener does not provide a desirable consistency while an excessively large content of the thickener reduces lubricity of the grease.

The grease according to the exemplary embodiment preferably has a worked penetration of 150 to 375 (in accordance with JIS K2220.7), more preferably of 200 to 340. When the worked penetration is 150 or more, the grease is not hard, and therefore is favorable in terms of low-temperature startability.

On the other hand, when the worked penetration is 375 or less, the grease is not too soft, and therefore is favorable in terms of lubricity.

The grease is used in an atmosphere of a fluorine compound-based refrigerant. The fluorine compound-based refrigerant is exemplified by a fluorine compound represented by the following molecular formula (A) or a saturated fluorohydrocarbon compound:

$$C_pO_qF_rR_s \qquad (A).$$

In the formula: R represents Cl, Br, I or H; p is an integer of 1 to 8; q is an integer of 0 to 2; r is an integer of 1 to 18; and s is an integer of 0 to 17. However, when q is 0, p is 2 to 8 and at least one carbon-carbon unsaturated bond is contained in a molecule.

The molecular formula (A) represents the kind and number of elements in a molecule and represents a fluorine compound in which the number p of carbon atoms C is 1 to 8. When the fluorine compound has 1 to 8 carbon atoms, the fluorine compound can exhibit physical and chemical properties required as a refrigerant such as a boiling point, a hardening point and latent heat of evaporation In order to exhibit more favorable properties, p is preferably 1 to 6.

In the molecular formula (A), a bonding pattern of the number p of carbon atoms, which is represented by $C_p$, includes a carbon-carbon single bond, an unsaturated bond such as a carbon-carbon double bond, a double bond of carbon-oxygen and the like. The unsaturated bond of carbon-carbon is preferably a carbon-carbon double bond in terms of stability. Although the number of the carbon-carbon double bond is 1 or more, 1 is preferable.

In the molecular formula (A), a bonding pattern of the number q of oxygen atoms, which is represented by $O_q$, is preferably a bond of oxygen atoms derived from an ether group, a hydroxyl group or a carbonyl group. The number q of the oxygen atoms may be 2, in which oxygen atoms with two ether groups, two hydroxyl groups or the like are also included.

When q is 0 in $O_q$ (i.e., no oxygen atom is contained in a molecule), p is 2 to 8 and at least one unsaturated bond such as carbon-carbon unsaturated bond is contained in a molecule. In other words, at least one of the bonding patterns of the number p of carbon atoms, which is represented by $C_p$, needs to be a carbon-carbon unsaturated bond.

Although R represents Cl, Br, I or H and may be any one of those in the molecular formula (A), R is preferably H because of less fear of destroying the ozone layer.

As described above, the fluorine compound represented by the molecular formula (A) is preferably exemplified by an unsaturated fluorohydrocarbon compound, fluoroether compound, fluoroalcohol compound and fluoroketone compound. Other fluorocompound-based refrigerant is a saturated fluorohydrocarbon compound.

These compounds will be explained below.

Unsaturated Fluorohydrocarbon Compound

In the exemplary embodiment, the unsaturated fluorohydrocarbon compound used as a refrigerant is exemplified by an unsaturated fluorohydrocarbon compound represented by the molecular formula (A) in which R is H, p is 2 to 8, q is 0, r is 1 to 16 and s is 0 to 15.

The unsaturated fluorohydrocarbon compound is preferably exemplified by a fluoride having a chain (linear or branched) olefin having 2 to 6 carbon atoms, preferably 3 to 5 carbon atoms, and a cyclic olefin having 4 to 6 carbon atoms.

Specific examples of the unsaturated fluorohydrocarbon compound are ethylene in which 1 to 3 fluorine atoms are introduced, propene in which 1 to 5 fluorine atoms are introduced, butenes in which 1 to 7 fluorine atoms are introduced, pentenes in which 1 to 9 fluorine atoms are introduced, hexenes in which 1 to 11 fluorine atoms are introduced, cyclobutene in which 1 to 5 fluorine atoms are introduced, cyclopentene in which 1 to 7 fluorine atoms are introduced, and cyclohexene in which 1 to 9 fluorine atoms are introduced.

Among these unsaturated fluorohydrocarbon compounds, an unsaturated fluorohydrocarbon compound having 2 to 3 carbon atoms is preferable and exemplified by fluorides of ethylene such as trifluoroethylene and fluorides of propenes, among which the fluorides of propenes are preferable. Examples of the fluorides of propenes include various isomers of pentafluoropropene, 3,3,3-trifluoropropene (HFO-1243zf), 1,3,3,3-tetrafluoropropene (HFO-1234ze), 2,3,3,3-tetrafluoropropene (HFO-1234yf) 1,2,3,3-tetrafluoropropene (HFO-1234ye) and 1,2,3,3,3-pentafluoropropene (HFO-1225ye), among which 1,2,3,3,3-pentafluoropropene (HFC1225ye) and 2,3,3,3-tetrafluoropropene (HFC1234yf) are particularly preferable.

In the exemplary embodiment, one of the unsaturated fluorohydrocarbon compounds may be used alone, or two or more thereof may be used in combination.

Fluoroether Compound

In the exemplary embodiment, the fluoroether compound used as a refrigerant is exemplified by a fluoroether compound represented by the molecular formula (A) in which R is H, p is 2 to 8, q is 1 to 2, r is 1 to 18 and s is 0 to 17.

Preferable examples of the fluoroether compound include: a fluoride of a chain aliphatic ether having 2 to 6 carbon atoms, 1 to 2 ether bonds and a linear or branched alkyl group; a fluoride of an alicyclic ether having 3 to 6 carbon atoms and 1 to 2 ether bonds; a polymer of fluoropropylene oxide; a polymer of fluoroethylene oxide; and a copolymer of fluoropropylene oxide and fluoroethylene oxide.

Specific examples of the fluoroether compound include: dimethyl ether in which 1 to 6 fluorine atoms are introduced, methyl ethyl ether in which 1 to 8 fluorine atoms are introduced, diethyl ether in which 1 to 10 fluorine atoms are introduced, dimethoxymethane in which 1 to 8 fluorine atoms are introduced, methyl propyl ethers in which 1 to 10 fluorine atoms are introduced, methyl butyl ethers in which 1 to 12 fluorine atoms are introduced, ethyl propyl ethers in which 1 to 12 fluorine atoms are introduced, oxetane in which 1 to 6 fluorine atoms are introduced, 1,3-dioxolan in which 1 to 6 fluorine atoms are introduced, tetrahydrofuran in which 1 to 8 fluorine atoms are introduced, a polymer of perfluoropropylene oxide, a polymer of perfluoroethylene oxide, and a copolymer of perfluoropropylene oxide and perfluoroethylene oxide.

More specifically, examples of the fluoroether compound include hexafluorodimethyl ether, pentafluorodimethyl ether, bis(difluoromethyl) ether, fluoromethyl trifluoromethyl ether, trifluoromethylmethyl ether, $CF_3CH_2OCF_2CHF_2$ (boiling point: 56 degrees C.) (ASAHIKLIN AE3000 manufactured by ASAHI GLASS CO., LTD.), perfluorodimethoxymethane, 1-trifluoromethoxy-1,1,2,2-tetrafluoroethane, difluoromethoxypentafluoroethane, 1-trifluoromethoxy-1,2,2,2-tetrafluoroethane, 1-difluoromethoxy-1,1,2,2-tetrafluoroethane, 1-difluoromethoxy-1,2,2,2-tetrafluoroethane, 1-trifluoromethoxy-2,2,2-trifluoroethane, 1-difluoromethoxy-2 fluoroethane, $C_4F_9OCH_3$ (boiling point: 61 degrees C.) (HFE7100 manufactured by 3M Company), perfluorooxetane, perfluoro-1,3-dioxolane, isomers of pentafluorooxetane, isomers of tetrafluorooxetane, and $CF_3$—$(OC(CF_3)FCF_2)m$-$(OCF_2)n$-$OCF_3$ (boiling point: 55 degrees C.) (Galden HT55 manufactured by Solvay Solexis Company).

Among these, $C_4F_9OCH_3$, $CF_3CH_2OCF_2CHF_2$ and $CF_3$—$(OC(CF_3)FCF_2)m$-$(OCF_2)n$-$OCF_3$ are preferable.

In the exemplary embodiment, one of the fluoroether compounds may be used alone, or two or more thereof may be used in combination.

Fluoroalcohol Compound

In the exemplary embodiment, the fluoroalcohol compound used as a refrigerant and represented by the formula (A) is exemplified by a fluoroether compound represented by the molecular formula (A) in which R is H, p is 1 to 8, q is 1 to 2, r is 1 to 17 and s is 1 to 16.

The fluoroalcohol compound is preferably exemplified by a fluoride of linear or branched aliphatic alcohol having 1 to 8 carbon atoms, preferably 1 to 6 carbon atoms, and 1 to 2 hydroxyl groups.

Specific examples of the fluoroalcohol compound include methyl alcohol in which 1 to 3 fluorine atoms are introduced, ethyl alcohol in which 1 to 5 fluorine atoms are introduced, propyl alcohols in which 1 to 7 fluorine atoms are introduced, butyl alcohols in which 1 to 9 fluorine atoms are introduced, pentyl alcohols in which 1 to 11 fluorine atoms are introduced, ethylene glycol in which 1 to 4 fluorine atoms are introduced, and propylene glycol in which 1 to 6 fluorine atoms are introduced.

More specifically, examples of the fluoroalcohol compound include monofluoromethyl alcohol, difluoromethyl alcohol, trifluoromethyl alcohol, isomers of difluoroethyl alcohol, isomers of trifluoroethyl alcohol, isomers of tetrafluoroethyl alcohol, pentafluoroethyl alcohol, isomers of difluoropropyl alcohol, isomers of trifluoropropyl alcohol, isomers of tetrafluoropropyl alcohol, isomers of pentafluoropropyl alcohol, isomers of hexafluoropropyl alcohol, heptafluoropropyl alcohol, isomers of difluorobutyl alcohol, isomers of trifluorobutyl alcohol, isomers of tetrafluorobutyl alcohol, isomers of pentafluorobutyl alcohol, isomers of hexafluorobutyl alcohol, isomers of heptafluorobutyl alcohol, isomers of octafluorobutyl alcohol, nonafluorobutyl alcohol, isomers of difluoroethylene glycol, trifluoroethylene glycol, tetrafluoroethylene glycol, isomers of difluoropropylene glycol, isomers of trifluoropropylene glycol, isomers of tetrafluoropropylene glycol, isomers of pentafluoropropylene glycol, fluoropropylene glycol such as hexafluoropropylene glycol, and fluorotrimethylene glycol corresponding to the fluoropropylene glycol.

In the exemplary embodiment, one of the fluoroalcohol compounds may be used alone, or two or more thereof may be used in combination.

Fluoroketone Compound

In the exemplary embodiment, the fluoroketone compound used as a refrigerant is a fluoroketone compound represented by the molecular formula (A) in which R is H, p is 2 to 8, q is 1 to 2, r is 1 to 16 and s is 0 to 15.

The fluoroketone compound is preferably exemplified by a fluoride of aliphatic ketone having 3 to 8 carbon atoms, preferably 3 to 6 carbon atoms and having a linear or branched alkyl group.

Specific examples of the fluoroketone compound include acetone in which 1 to 6 fluorine atoms are introduced, methyl ethyl ketone in which 1 to 8 fluorine atoms are introduced, diethyl ketone in which 1 to 10 fluorine atoms are introduced, methyl propyl ketone in which 1 to 10 fluorine atoms are introduced, and ethyl propyl ketones in which 1 to 12 fluorine atoms are introduced.

More specifically, examples of the fluoroketone compound include hexafluorodimethyl ketone, pentafluorodimethyl ketone, bis(difluoromethyl)ketone, fluoromethyl trifluoromethyl ketone, trifluoromethylmethyl ketone, perfluoromethylethyl ketone, trifluoromethyl-1,1,2,2-tetrafluoroethyl ketone, difluoromethylpentafluoroethyl ketone, trifluoromethyl-1,1,2,2-tetrafluoroethyl ketone, difluoromethyl-1,1,2,2-tetrafluoroethyl ketone, difluoromethyl-1,2,2,2-tetrafluoroethyl ketone, trifluoromethyl-2,2,2-trifluoroethyl ketone, difluoromethyl-2,2,2-trifluoroethyl ketone, and $CF_3CF_2C(O)CF(CF_3)_2$ (boiling point: 49 degrees C.) (NOVEC649 manufactured by 3M Company).

Among these, $CF_3CF_2C(O)CF(CF_3)_2$ is preferable because of having an appropriate boiling point.

In the exemplary embodiment, one of the fluoroketone compounds may be used alone, or two or more thereof may be used in combination.

Saturated Fluorohydrocarbon Compound

The saturated fluorohydrocarbon compound used as a refrigerant in the exemplary embodiment is preferably a fluoride of alkane having 1 to 4 carbon atoms, examples of which include difluoromethane (HFC-32), trifluoromethane (HFC-23), fluoroethane (HFC-161), 1,1-difluoroethane (HFC-152a), 1,1,1-trifluoroethane (HFC-143a), 1,1,2-trifluoroethane (HFC-143), 1,1,1,2-tetrafluoroethane (HFC-134a), 1,1,2,2-tetrafluoroethane (HFC-134), pentafluoroethane (HFC-125), 1,1,1,3,3-pentafluoropropane (HFC-245fa), 1,1,1,2,3,3-hexafluoropropane (HFC-236ea), 1,1,1,3,3,3-hexafluoropropane (HFC-236fa), 1,1,1,2,3,3,3-heptafluoropropane (HFC-227ea), $CF_3CHFCHFCF_2CF_3$ (boiling point: 55 degrees C.) (Vertrel XF manufactured by Du Pont-Mitsui Fluorochemicals Co., Ltd.) and $CF_3CH_2CF_2CH_3$ (boiling point: 40 degrees C.) (Solkane 365 mfc manufactured by Solvay Solexis Company). Among these, $CF_3CHFCHFCF_2CF_3$ and $CF_3CH_2CF_2CH_3$ are preferable because of having an appropriate boiling point.

In the exemplary embodiment, one of the saturated fluorohydrocarbon compounds may be used alone, or two or more thereof may be used in combination.

Moreover, one of the aforementioned refrigerants (the compound represented by the formula (A) and the saturated fluorohydrocarbon compound) may be used alone, or two or more thereof may be used in combination.

Herein, examples of the bearing to which the grease is applied include an angular contact ball bearing, a deep groove ball bearing, a self-aligning ball bearing and a thrust ball bearing, among which the angular contact ball bearing is preferable because of being advantageous for enhancing speed and size reduction and being widely used as a bearing for a turbo machine.

When the grease is used, elution of the grease into a fluorine compound-based refrigerant is small, so that lubricity for the bearing can be kept for a long period. Moreover, since the grease often requires no collection system and storage tank unlike a lubricating oil and can make the surroundings of the bearing compact, the grease is easily applicable to an energy collection apparatus with use of the Rankine cycle (in a turbo type and the like). Such an energy collection apparatus is preferably used in a variety of industrial machinery (chemical plants, oil refinery plants, ironworks, machine manufacturing plants and heat treatment plants) and automobiles.

An exemplary application of the bearing with use of the grease will be described below.

Figure 1:
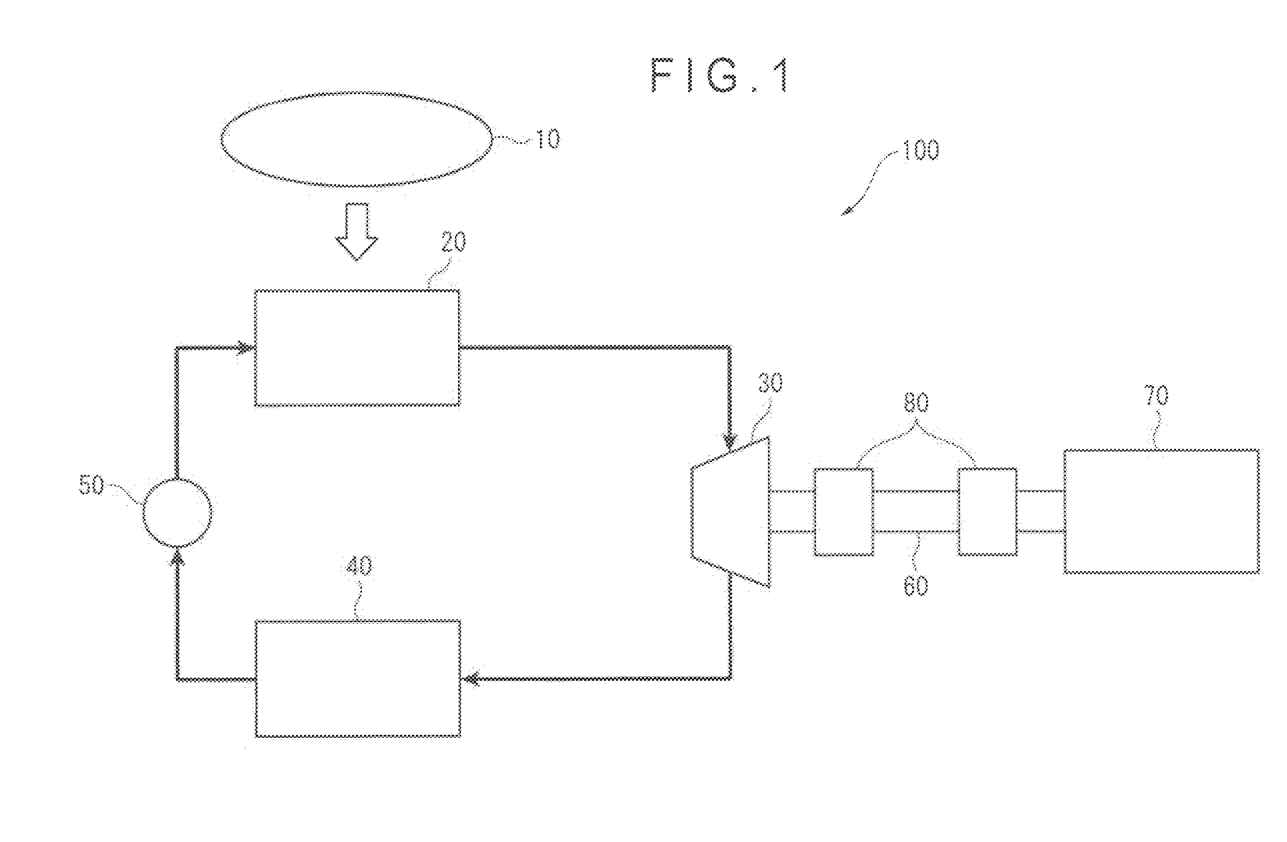
FIG. 1 schematically shows a power generator with use of the Rankine cycle.

FIG. 1 schematically shows a power generator 100 with use of the Rankine cycle. In the Rankine cycle, an evaporator 20 generates refrigerant vapor using heat from a waste heat source 10 of an engine and a variety of industrial machinery, thereby rotating an impeller of a power generating turbine 30. The refrigerant passing through the power generating turbine 30 is liquefied by a condenser 40 and returned to the evaporator 20 by a pump 50 to circulate in the system. A shaft 60 jointed to the impeller of the power generating turbine 30 is rotated, whereby electricity is generated at a power generating unit 70. The shaft 60 is rotatably held by bearings 80. The grease is used in the bearings 80.

As long as an object of the invention is achieved, the grease may be added with additives such as an antioxidant, rust inhibitor, solid lubricant, filler, oiliness agent, metal deactivator, water resistant agent, extreme pressure agent, antiwear agent, viscosity index improver and coloring agent if necessary.

Examples of the extreme pressure agent include: zinc dialkyldithiophosphate; molybdenum dialkyldithiophosphate; thiocarbamates such as ashless dithiocarbamate, zinc dithiocarbamate and molybdenum dithiocarbamate; sulfur compounds (e.g., sulfurized fat and oil, olefin sulfide, polysulfide, sulfide mineral oil, thiophosphoric acids, thioterpenes, dialkylthiodipropionates); phosphate; and phosphite (e.g., tricresyl phosphate and triphenyl phosphite). Examples of the oiliness agent include alcohols, carboxylic acids, glycerides and esters. A content of the oiliness agent is preferably in a range of approximately 0.1 mass % to 5 mass % (based on the total amount of the grease).

Examples of the antioxidant include: an aminic antioxidant such as alkylated diphenylamine, phenyl-alpha-naphthylamine and alkylated phenyl-alpha-naphthylamine; and a phenolic antioxidant such as 2,6-di-t-butyl-4-methylphenol and 4,4'-methylenebis(2,6-di-t-butylphenol), and a peroxide decomposing agent such as a sulfuric antioxidant and ZnDTP. A content of the antioxidant is typically in a range of 0.05 mass % to 10 mass %.

Examples of the rust inhibitor include benzotriazole, zinc stearate, succinate, succinic acid derivative, thiadiazole, benzotriazole, benzotriazole derivative, sodium nitrite, petroleum sulphonate, sorbitan monooleate, fatty acid soap and amine compound.

Examples of the solid lubricant include polyimide, PTFE, graphite, metal oxide, boron nitride, melamine cyanurate (MCA) and molybdenum disulfide.

EXAMPLES

Next, the invention will be explained in further detail with reference to Examples and Comparatives, but the invention is not limited thereto.

Examples 1-3 and Comparatives 1-3

In each of Examples and Comparatives, grease was prepared according to compositions shown in Tables 1 and 2 below. While the grease was in contact with four kinds of fluorine compound-based refrigerants, elution characteristics of a base oil from the grease were evaluated. Evaluation results are shown in Tables 1 and 2.

TABLE 1

| | | | Example 1 | Example 2 | Example 3 |
|---|---|---|---|---|---|
| Blend Composition of Grease (mass %) | Base Oil | tetraalkyldiphenyl ether (*1) | remained | remained | remained |
| | | Poly-alpha-olefin (*2) | — | — | — |
| | | pentaerythritol tetranonyl ester | — | — | — |
| | Thickener | Urea A (alicyclic) (*3) | — | — | — |
| | | Urea B (aliphatic) (*4) | — | — | — |
| | | Urea C (aliphatic) (*5) | 11.0 | 15.0 | 8.3 |
| | Antioxidant | dioctyl diphenylamine | 1.0 | 1.0 | 1.0 |
| | Rust Inhibitor | zinc stearate | — | — | — |
| | | succinate | 0.1 | 0.1 | 0.1 |
| | (Total) | | 100.0 | 100.0 | 100.0 |
| Grease Properties | | Worked Penetration | 280 | 246 | 333 |
| Refrigerant Contact Test (Base Oil Separation Ratio %) | A: $C_4F_9OCH_3$ (*6) | | 1 | — | — |
| | B: $CF_3CF_2C(O)CF(CF_3)_2$ (*7) | | 13 | — | — |
| | C: $CF_3CH_2OCF_2CHF_2$ (*8) | | 0 | 0 | 0 |
| | D: $CF_3$—$(OC(CF_3)FCF_2)m$—$(OCF_2)n$—$OCF_3$ (*9) | | 3 | — | — |
| | E: $CF_3CH_2CF_2CH_3$ (*10) | | 0 | 0 | 0 |

TABLE 2

| | | | Comparative 1 | Comparative 2 | Comparative 3 |
|---|---|---|---|---|---|
| Blend Composition of Grease (mass %) | Base Oil | tetraalkyldiphenyl ether (*1) | — | — | — |
| | | Poly-alpha-olefin (*2) | remained | remained | — |
| | | pentaerythritol tetranonyl ester | — | — | remained |
| | Thickener | Urea A (alicyclic) (*3) | 10.5 | — | — |
| | | Urea B (aliphatic) (*4) | 4.5 | — | — |
| | | Urea C (aliphatic) (*5) | — | 15.0 | 15.0 |
| | Antioxidant | dioctyl diphenylamine | 1.0 | 1.0 | 1.0 |
| | Rust Inhibitor | zinc stearate | — | 0.1 | 0.1 |
| | | succinate | — | — | 0.3 |
| | (Total) | | 100.0 | 100.0 | 100.0 |
| Grease Properties | | Worked Penetration | 235 | 256 | 222 |
| Refrigerant Contact Test (Base Oil Separation Ratio %) | A: $C_4F_9OCH_3$ (*6) | | 28 | — | — |
| | B: $CF_3CF_2C(O)CF(CF_3)_2$ (*7) | | 15 | — | — |
| | C: $CF_3CH_2OCF_2CHF_2$ (*8) | | 27 | 58 | 30 |
| | D: $CF_3$—$(OC(CF_3)FCF_2)m$—$(OCF_2)n$—$OCF_3$ (*9) | | 22 | — | — |
| | E: $CF_3CH_2CF_2CH_3$ (*10) | | 33 | — | — |

*1tetraalkyldiphenyl ether: having alkyl groups having 8 to 12 carbon atoms in combination, kinematic viscosity at 40 degrees C. of 100 mm$^2$/s
*2poly-alpha-olefin, kinematic viscosity at 40 degrees C. of 46.7 mm$^2$/s, kinematic viscosity at 100 degrees C. of 7.8 mm$^2$/s, viscosity index of 137
*3Urea A (alicyclic): a reactant of cyclohexylamine and methylenediisocyanate
*4Urea B (aliphatic): a reactant of stearylamine and methylenediisocyanate
*5Urea C (aliphatic): a reactant of octylamine and methylenediisocyanate
*6Refrigerant A: $C_4F_9OCH_3$ (boiling point: 61 degrees C.) (HFE7100 manufactured by 3M Company)
*7Refrigerant B: $CF_3CF_2C(O)CF(CF_3)_2$ (boiling point: 49 degrees C.) (NOVEC649 manufactured by 3M Company)
*8Refrigerant C: $CF_3CH_2OCF_2CHF_2$ (boiling point: 56 degrees C.) (ASAHIKLIN AE3000 manufactured by ASAHI GLASS CO., LTD.)
*9Refrigerant D: $CF_3$—$(OC(CF_3)FCF_2)m$—$(OCF_2)n$—$OCF_3$ (boiling point: 55 degrees C.) (Galden HT55 manufactured by Solvay Solexis Company)
*10Refrigerant E: $CF_3CH_2CF_2CH_3$ (boiling point: 40 degrees C.) (Solkane 365mfc manufactured by Solvay Solexis Company)

It should be noted that the aforementioned ureas (diureas) were each manufactured as follows, in which the greases were simultaneously manufactured.

Firstly, amine was dissolved in half of the base oil to prepare a solution (a). Next, methylenediisocyanate was dissolved in the other half of the base oil to prepare a solution (b). Subsequently, the solutions (a) and (b) were mixed and reacted. After the reaction, the reactant was heated until reaching in the vicinity of 160 degrees C. to 170 degrees C. while being stirred, and was further stirred for an hour while maintaining the temperature. Subsequently, the reactant was cooled and added with an antioxidant and a rust inhibitor, and was further subjected to milling treatment and defoaming treatment to obtain grease.

Evaluation Method
(1) Consistency

Consistency was measured according to JIS K 2220.7.
(2) Elution Characteristics of Grease (Refrigerant Contact Test)

After the greases were prepared from the base oils and the thickeners shown in the above Tables, in each of the greases, elution characteristics of the base oil into the refrigerant were evaluated in accordance with "Grease Evaluation Method" of JPA-2010-151016. Evaluation was specifically performed as follows.

Figure 2:
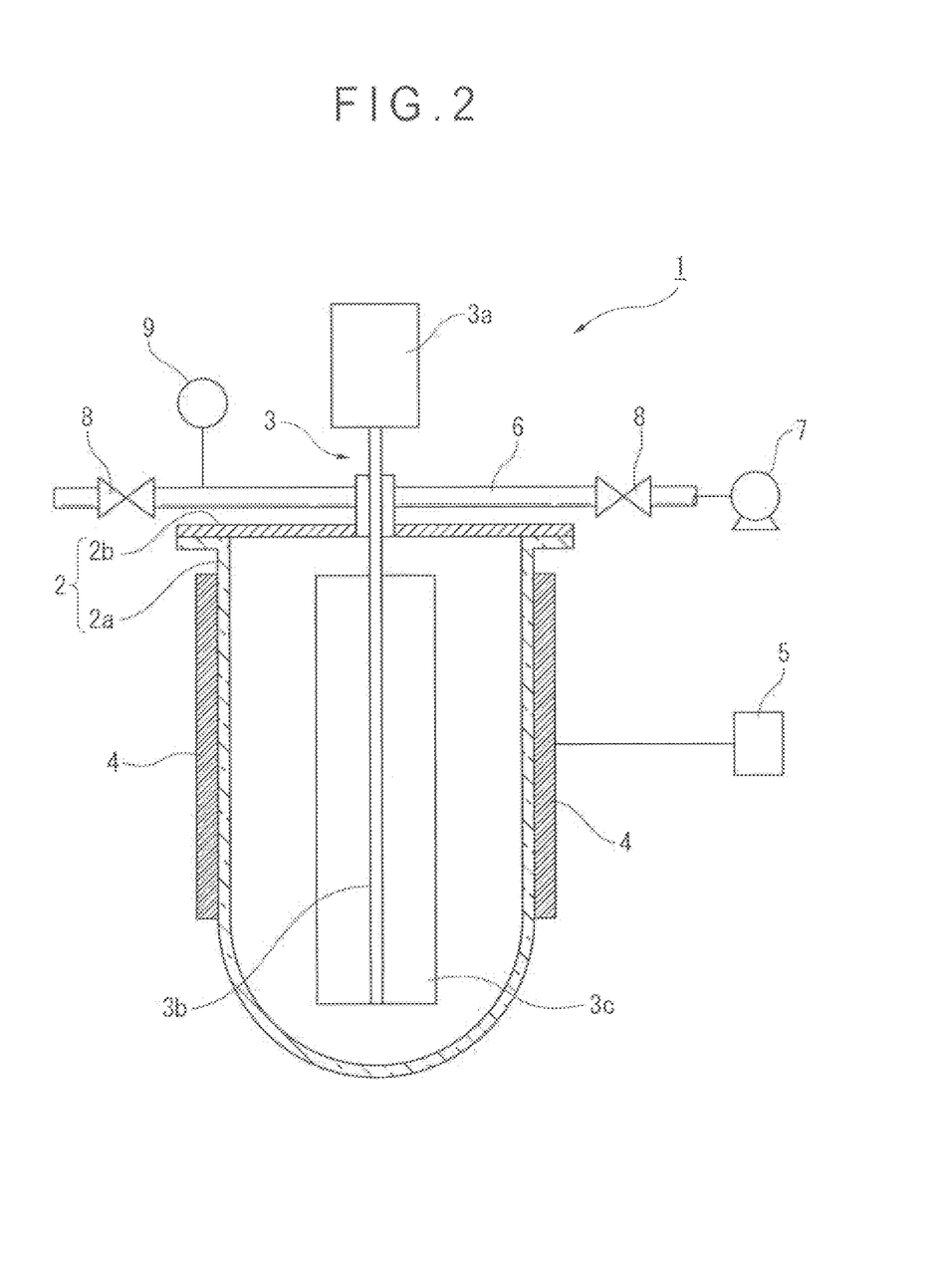
FIG. 2 schematically shows a structure of a separation evaluation apparatus in Examples.
Figure 3A:
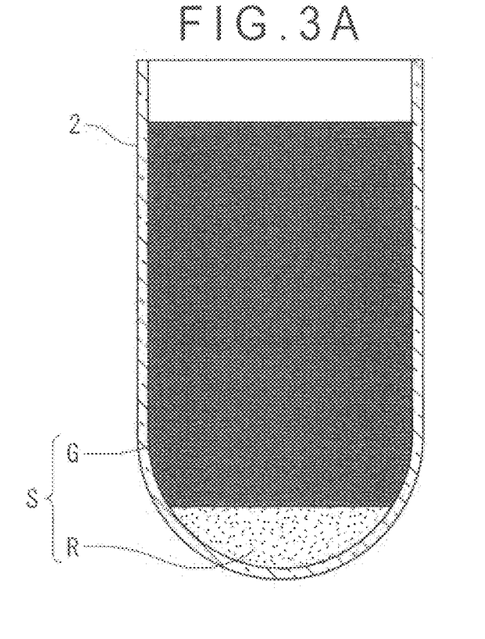
FIG. 3A shows an evaluation sample held in a separation bath, in which a base oil is separated from diluted grease.
Figure 3B:
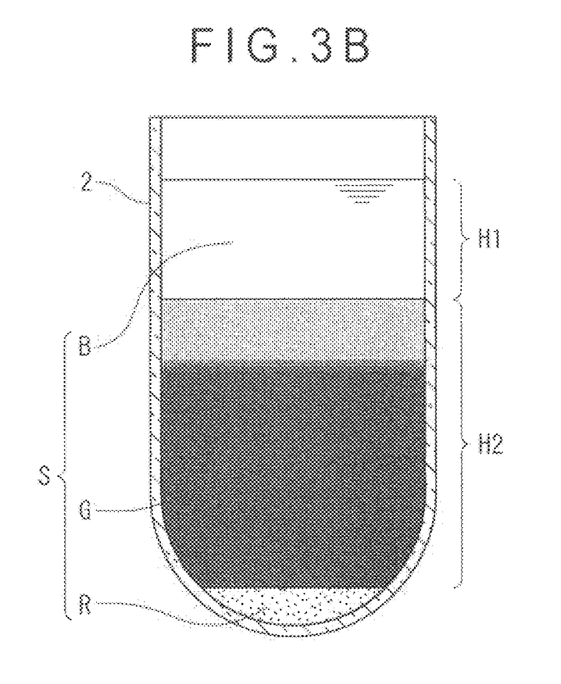
FIG. 3B shows the evaluation sample after a temperature cycle treatment, in which the base oil is separated from the diluted grease.

A base oil, which was the same one as used as a component of each of the greases (evaluation target), was separately prepared. The grease and the base oil were collected at a mass ratio of 1:20 and completely mixed using a homogenizer. Next, 50 g of the diluted grease and 9 g of the refrigerant (evaluation target) were put into a transparent vessel (FIG. 2) of which an inside was washed in advance. The transparent vessel was covered with a cover 2b to keep the inside air-tight. At this time, as shown in FIG. 3A, although an evaluation sample S was separated into a layer of a refrigerant R (evaluation target) and a layer of diluted grease G, a base oil as a component of the diluted grease G was not separated but remained in the layer of the diluted grease G. Valves 8 of a pipe 6 provided to the cover 2b were both closed. Next, an inside of a separation bath 2 was stirred using an agitation fin 3c to uniformly mix the diluted grease and the refrigerant (evaluation target) to provide an evaluation sample. A cycle operation for two hours at the room temperature and two hours at 110 degrees C. with agitation was repeated six times, in other words, an experiment for 24 hours in total was conducted. Subsequently, the evaluation sample was left still for 24 hours at the room temperature and was stabilized. Then, the base oil B and the refrigerant R (evaluation target) were separated as shown in FIG. 3B.

A ratio of the layer of the base oil B separated from the diluted grease G was measured to calculate a base oil separation ratio. Specifically, a height H1 of the layer of the separated base oil B and a height H2 of the layer of the diluted grease G were directly measured using a measuring tape from an outside of the transparent separation bath 2 shown in FIG. 3B. The base oil separation ratio was calculated from the obtained measurement value according to the following formula:

The base oil separation ratio=$\{H1/(H1+H2)\}\times 100$.

Practically, the base oil separation ratio is preferably 25% or less, more preferably 15% or less, further preferably 10% or less. Ideally, the base oil separation ratio is 0%.

Evaluation Results

As shown in Table 1, since the grease in each of Examples is manufactured containing predetermined base oil and thickener, all the greases exhibit a low base oil separation ratio. Accordingly, even when the base oil of the invention is applied to a bearing in an atmosphere of a fluorine compound-based refrigerant, lubricity for the bearing can be kept for a long period. In contrast, as shown in the results of Table 2, since the base oil of the grease in each of Comparatives is not an ether compound, all the grease exhibit a high base oil separation ratio. Accordingly, it is difficult to apply the grease of each of Comparatives to a bearing in an atmosphere of a fluorine compound-based refrigerant.

The invention claimed is:

1. A lubricating method, comprising:
refrigerating with a fluorine compound-based refrigerant in an apparatus comprising a bearing, and
contacting the fluorine compound-based refrigerant with a bearing grease,
wherein the bearing has been lubricated with the bearing grease,
the bearing grease comprises an ether base oil and a urea thickener, and
the bearing grease is suitable for lubricating the bearing in an atmosphere of the fluorine compound-based refrigerant.

2. The lubricating method according to claim 1,
wherein the ether base oil is an aromatic ether base oil.

3. The lubricating method according to claim 2,
wherein the aromatic ether base oil is at least one selected from the group consisting of an alkylphenyl ether base oil and a diphenyl ether base oil.

4. The lubricating method according to claim 1,
wherein the urea thickener is a product of methylenediisocyanate and an aliphatic monoamine having 6 to 12 carbon atoms.

5. The lubricating method according to claim 1,
wherein a worked penetration of the bearing grease is in a range of from 200 to 380.

6. The lubricating method according to claim 1, wherein the fluorine compound-based refrigerant is either a fluorine compound of molecular formula (A):

$$C_pO_qF_rR_s \qquad (A),$$

or a saturated fluorohydrocarbon compound,
wherein R is Cl, Br, I, or H;
p is an integer of from 1 to 8;
q is an integer of from 0 to 2;
r is an integer of from 1 to 18; and
s is an integer of from 0 to 17, with a proviso that, when q is 0, p is from 2 to 8 and at least one carbon-carbon unsaturated bond is contained in a molecule.

7. The lubricating method according to claim 1, wherein the fluorine compound-based refrigerant is at least one compound selected from the group consisting of $C_4F_9OCH_3$, $CF_3CF_2C(O)CF(CF_3)_2$, $CF_3CH_2OCF_2CHF_2$, $CF_3CHFCHFCF_2CF_3$, $CF_3$—$(OC(CF_3)FCF_2)m$-$(OCF_2)n$-$OCF_3$, and $CF_3CH_2CF_2CH_3$.

8. The lubricating method according to claim 7, wherein the fluorine compound-based refrigerant is at least one compound selected from the group consisting of $C_4F_9OCH_3$, $CF_3CH_2OCF_2CHF_2$, $CF_3CHFCHFCF_2CF_3$, $CF_3$—$(OC(CF_3)FCF_2)m$-$(OCF_2)n$-$OCF_3$, and $CF_3CH_2CF_2CH_3$.

9. The lubricating method according to claim 1,
wherein the bearing grease is suitable for a bearing in a Rankine cycle.

10. The lubricating method according to claim 9,
wherein the bearing grease is suitable for a bearing in a turbo Rankine cycle.

11. The lubricating method according to claim 1, wherein the bearing grease is not highly soluble in the fluorine compound-based refrigerant.

12. The lubricating method according to claim 1, wherein a base oil separation ratio of the bearing grease and the fluorine compound-based refrigerant is less than 15%.

13. The lubricating method according to claim 1, wherein a base oil separation ratio of the bearing grease and the fluorine compound-based refrigerant is 10% or less.

* * * * *